Patented May 6, 1952

2,595,371

UNITED STATES PATENT OFFICE 2,595,371

INSECT REPELLENT OINTMENT COMPRISING HYDROGENATED ROTENONE AND 2-AMINO-2 METHYL-1,3-PROPANEDIOL

Robert W. Scanlan and Hugh R. Cunningham, Bartlesville, Okla., assignors to Phillips Petroleum Company, a corporation of Delaware No Drawing. Application May 2, 1947, Serial No. 745,654

2 Claims. (Cl. 167—24)

This invention relates to an insect repellent ointment and more specifically to a composition which comprises insect repellents and soothing ingredients in admixture with a cold cream base.

So-called insect repellent creams used heretofore have not effectively repelled all types of insects such as mosquitoes, flies, fleas, ants, mites, chiggers and the like. Also insect repellent creams of the prior art do not exhibit soothing properties for insect bites existing at the time of application.

The principal object of the present invention is to provide a composition in the form of an ointment which when applied to the exposed parts of the body will repel insects such as those just mentioned and at the same time will soothe insect bites already existing. Another object is to provide an insect repellent ointment which comprises insect repellents and soothing ingredients in admixture with a cold cream base. Another object is to provide an improved method of making an ointment of the foregoing type. Many other objects will more fully hereinafter appear.

We have now discovered an all-purpose insect-protective cream which is not only more effective in repelling the types of insects, such as mosquitoes, flies, fleas, ants, mites, chiggers, etc., which are commonly encountered, but also in soothing insect bites that may be present at the time of application. This dual function is very important if the preparation is to find wide-spread acceptance in combatting insects. The insect-repellency of the ointment of the present invention is enhanced not only as to species affected but also in potency so that application to a relatively small area of the exposed skin will give adequate protection. These results are accomplished without sacrificing some of the desirable properties of cold creams, namely, protection against wind and weather, freedom from unpleasant odor, staining of clothing, unsightly appearance, etc.

In its broadest aspect, the insect repellent ointment of the present invention comprises hydrogenated rotenone and 2-amino-2-methyl-1,3-propanediol as the active insect repelling ingredients and phenol and zinc stearate as the active soothing ingredients in admixture with a cold cream base. We have found that an insect repellent ointment of this type has no adverse physiological effects and is extremely convenient to use and very effective. We have found that the insect repelling ingredients and the soothing ingredients which are enumerated above are completely compatible with a cold cream base and that the resulting composition is uniform in consistency and retains its insect repelling and soothing properties over an indefinite period of time.

While any suitable cold cream base may be used in the practice of the present invention, we have found that a cold cream base consisting of beeswax, stearic acid, spermaceti, mineral oil, glycerin and water gives the necessary consistency and physical properties desired in the ointment and serves most effectively as the carrier for the active ingredients of the composition.

In a preferred embodiment, our insect repellent cream or ointment comprises the following ingredients in the following ranges of proportions:

| | Parts by weight |
|---|---|
| Beeswax | 1 to 10 |
| Stearic acid | 5 to 40 |
| Spermaceti | 1 to 5 |
| Hydrogenated rotenone | 0.05 to 0.25 |
| Mineral oil | 5 to 40 |
| 2-amino-2-methyl-1,3-propanediol | 1 to 5 |
| Glycerin | 1 to 10 |
| Phenol | 0.1 to 1 |
| Zinc stearate | 0.1 to 1 |
| Water | 20 to 100 |

Still more preferably the insect repellent ointment of the present invention comprises the foregoing ingredients in the specific proportions given in the example below.

We prefer to use hydrogenated rotenone in the form known in the trade as "Dihydrolin" which is a dilute solution of hydrogenated rotenone in mineral oil, and may for example be obtained in a 1 per cent concentration or in a 2 per cent concentration. The concentrations given refer to percentage by weight of hydrogenated rotenone in the "Dihydrolin."

A portion or all of the mineral oil component may be in the "Dihydrolin."

The mineral oil may be any suitable non-volatile normally liquid essentially paraffinic oil such as medicinal white oil or other highly refined petroleum oil.

Hydrogenated rotenone is a well-known material, being described for example in U. S. patents to Wotherspoon Nos. 2,052,374 and 2,126,854. It is often designated as dihydrorotenone.

It is preferred to prepare the ointment of the present invention in the following manner. The oil-soluble ingredients (beeswax, stearic acid, spermaceti, hydrogenated rotenone, mineral oil and zinc stearate) are commingled and heated to 70° C. to produce a homogeneous mixture. The water-soluble ingredients (the 2-amino-2-methyl-1,3-propanediol, glycerin and phenol) and the water are commingled and heated to boiling to produce a second homogeneous mixture. These two mixtures are then brought together at the resulting temperatures with thorough agitation to produce a uniform mixture. The resulting mixture is then cooled to room temperature. It may be packaged before or after cooling.

It is often preferred to add a trace of suitable perfume to the composition. This may be incorporated in any suitable manner during the formulation of example by incorporation with the oil-soluble mixture before admixture with the water-soluble mixture.

One specific embodiment of the present invention is given in the following example.

*Example*

| | Parts by weight |
|---|---|
| Beeswax | 5 |
| Stearic acid | 25 |
| Spermaceti | 3 |
| Hydrogenated rotenone | 0.125 |
| Mineral oil | 20.375 |
| 2-amino-2-methyl-1,3-propanediol | 1.5 |
| Glycerin | 7 |
| Phenol | 0.5 |
| Zinc stearate | 0.8 |
| Water | 50 |
| Perfume | 0.1 |

These ingredients are mixed as described above with vigorous stirring.

The foregoing specific example is based on the use of hydrogenated rotenone in the form of "Dihydrolin" consisting of 2 per cent hydrogenated rotenone in mineral oil. Six and one-fourth parts by weight of this form of "Dihydrolin" were used together with 14.25 parts by weight of extraneous mineral oil, to give 0.125 parts by weight of hydrogenated rotenone and a total of 20.375 parts by weight of mineral oil in the finished composition. If 1 per cent "Dihydrolin" is employed suitable adjustment of the proportions of "Dihydrolin" and extraneous mineral oil are made to give an ointment having essentially the foregoing composition.

Hydrogenated rotenone in combination with 2-amino-2-methyl-1,3-propanediol are the active ingredients which provide insect repellency against many species of insects. The phenol and zinc stearate provide soothing properties.

It is not essential that the ointment of the present invention be applied to the entire exposed area in order to obtain adequate protection against insects. Commonly encountered insects will be satisfactorily repelled if small quantities of the cream are dabbed upon the arms, ankles, neck, etc. In a similar manner, ants may be kept away from food, for example, on a picnic by the application of the ointment to containers, dishes, etc. Other uses will be apparent, as, for example, application to the legs of cots and beds to repel ants and other crawling insects, application as a ring to the trunk of trees to reduce infestation by crawling insects, etc.

From the foregoing description it will be seen that the present invention provides an unusually effective insect repellent ointment. The ointment of the present invention not only effectively repels insects such as those above enumerated but also exhibits soothing properties upon insect bites present at the time of application. The ointment also gives protection against wind and weather and does not cause undesirable staining of the clothing. It is very convenient to use, generally being applied by simply rubbing into the skin. It is physiologically inert so that no undesirable reactions take place. It is economical to manufacture and may be kept indefinitely without losing its potency. It has found wide commercial acceptance and is extremely satisfactory. Other advantages of the ointment of the present invention will be apparent to those skilled in the art.

We claim:

1. An insect repellent ointment prepared by forming an intimate mixture of:

| | Parts by weight |
|---|---|
| Beeswax | 5 |
| Stearic acid | 25 |
| Spermaceti | 3 |
| Hydrogenated rotenone | 0.125 |
| Mineral oil | 20.375 |
| 2-amino-2-methyl-1,3-propanediol | 1.5 |
| Glycerin | 7 |
| Phenol | 0.5 |
| Zinc stearate | 0.8 |
| Water | 50 |

2. An insect repellent ointment prepared from:

| | Parts by weight |
|---|---|
| Beeswax | 5 |
| Stearic acid | 25 |
| Spermaceti | 3 |
| Hydrogenated rotenone | 0.125 |
| Mineral oil | 20.375 |
| 2-amino-2-methyl-1,3-propanediol | 1.5 |
| Glycerin | 7 |
| Phenol | 0.5 |
| Zinc stearate | 0.8 |
| Water | 50 | by commingling oil-soluble ingredients and heating same to 70° C. to produce a homogeneous mixture, commingling water-soluble ingredients with said water and heating to boiling to produce a homogeneous mixture, commingling resulting mixtures at elevated temperatures to produce a uniform mixture, and cooling a resulting mixture.

ROBERT W. SCANLAN.
HUGH R. CUNNINGHAM.

REFERENCES CITED

The following references are of record in the file of this patent:

UNITED STATES PATENTS

| Number | Name | Date |
|---|---|---|
| 1,755,178 | Grant | Apr. 22, 1930 |
| 1,911,551 | Cleveland | May 30, 1933 |
| 1,834,057 | Grant | Nov. 7, 1933 |
| 2,052,374 | Wotherspoon | Aug. 25, 1936 |

OTHER REFERENCES

Lindquist et al.: J. Econ. Entom. 37, No. 4 (1944), pp. 485, 486.

Bergy: J. A. P. A. Prac. Pharm. Ed. October 1942, pp. 358–364.

De Navarre: "The Chem. & Mfg. of Cosmetics," D. Van Nostrand Co., Inc., New York, 1941, pp. 211–242.

Wood et al.: "United States Dispensatory," 21st ed., J. P. Lippincott Co., Phila., pp. 829–833.